(No Model.)
O. M. KELSO.
ANIMAL HOLDER.
No. 490,968. Patented Jan. 31, 1893.
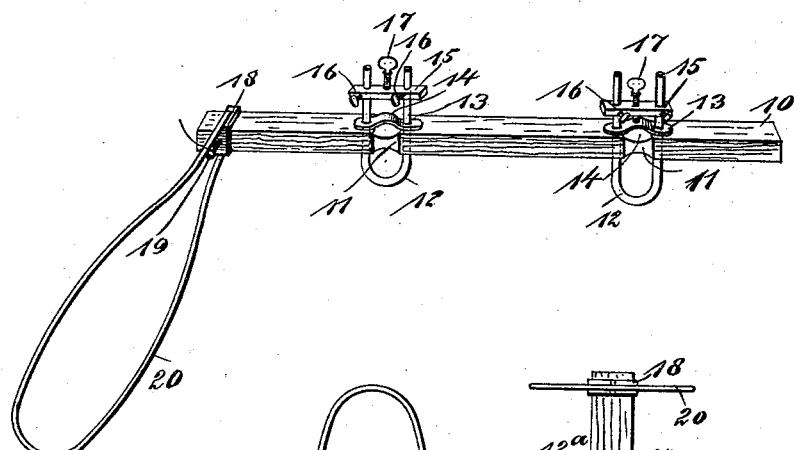
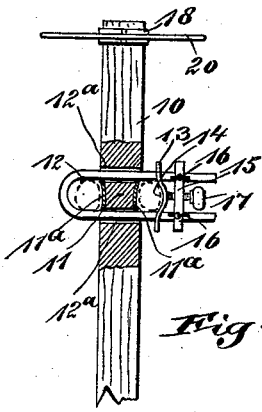
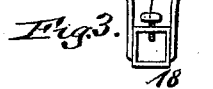
WITNESSES:
INVENTOR
O. M. Kelso
BY Munn & Co
ATTORNEYS.

UNITED STATES PATENT OFFICE.

OLIVER M. KELSO, OF ROCK RAPIDS, IOWA.

ANIMAL-HOLDER.

SPECIFICATION forming part of Letters Patent No. 490,968, dated January 31, 1893.

Application filed September 12, 1892. Serial No. 445,618. (No model.)

*To all whom it may concern:*

Be it known that I, OLIVER M. KELSO, of Rock Rapids, in the county of Lyons and State of Iowa, have invented a new and Improved Animal-Holder, of which the following is a full, clear, and exact description.

My invention relates to improvements in animal holders or tethers such as are adapted for use in fastening the legs of animals together.

The object of the invention is to provide a cheap and convenient device which may be quickly and easily applied to a hog, sheep, calf, or other animal so as to fasten the feet together, and also to produce an article which will hold the legs of the animal so that the animal will be comparatively comfortable and uninjured and in such a way as to guard against the animal getting loose.

The invention is especially intended to hold animals securely while they are being carried to market or while certain operations are being performed upon them, such for instance as to hold a sheep while it is being sheared, a hog while it is being stuck, or a calf while it is being carried to market.

To these ends my invention consists in certain features of construction and combinations of parts, as will be hereinafter described and claimed.

Reference is to be had to the accompanying drawings forming a part of this specification, in which similar figures of reference indicate corresponding parts in all the views.

Figure 1 is a perspective view of the complete apparatus; Fig. 2 is a detail view, partly in section, showing the construction of one of the clamps; and Fig. 3 is a detail view of a loop which is adapted to be placed upon the neck of an animal so as to prevent the creature from throwing its head.

The frame of the device consists of a bar 10 which, near its end portions, is reduced and rounded, as shown at 11, these portions being adapted to come in contact with the legs of a creature and for this reason they are preferably lined, as shown at 11ª in Fig. 2, so as to prevent the creature's legs from being chafed. Each reduced portion is straddled by a U-shaped yoke 12, the members of which are held to slide in perforations 12ª in the bar 10. The opposite members of each yoke are connected on one side of the bar by a clamping piece 13 which slides on the members of the yoke and is bent outward near the center, as shown at 14, so as to fit nicely upon an animal's legs. Near the free ends of the yoke and outside of the clamping piece is a locking plate 15, which also slides on the yoke and is secured thereto by set screws 16 which project through it and impinge on the members of the yoke. Near the center of the locking plate is secured a thumb screw 17 which projects inward and impinges on the center of the clamping piece 13, and by this means the clamping piece may be forced inward so as to be held firmly against the legs of the animal.

When the holder is used for calves, a loop is preferably attached to it which will prevent them from bobbing or throwing around their heads, as is their custom. To this end a clip or clasp 18 is used which fits one end of the bar and is held in place by a thumb-screw 19. A loop 20 is secured to the clip or clasp so as to extend at nearly right angles to the bar 10, and consequently when the loop is fastened upon the calf's neck and the clit. is secured to the bar, the animal is prevented from moving its head to any great extend The loop, however, is easy to the neck and does not injure or hurt the animal.

The apparatus is made in different sizes, according to the kind of animal it is to be used upon, and the reduced portions 11 are adapted to come opposite the fore and hind legs of the animal to which it is applied.

The device is applied as follows:—The bar 10 is made to extend lengthwise of the animal and between its legs, and the hind legs are secured in one of the yokes 12 so as to be held in the reduced portion 11 of the bar, while the fore legs are held in the other yoke. The yokes are tightened and fastened by means of the locking plate 15, and the thumb screws 17 are turned so as to press the clamping pieces 14 firmly against the legs of the animal. It will thus be seen that the bar 10 will prevent the legs from being pressed together, and for this reason the apparatus will be easy to the creature and will also prevent it from getting loose. For most animals the loop 20 is unnecessary, but for those which have a habit of tossing their heads it is used, and it is applied by slipping it over the neck of the creature and then fastening the clip or clasp 18 to the bar in the manner specified.

Having thus described my invention, I claim as new, and desire to secure by Letters Patent:—

1. An animal holder, comprising a bar, movable yokes held to slide transversely in the bar and adapted to embrace the legs of an animal, clamping pieces held to slide upon the yokes, and a fastening device to secure the yokes and clamping pieces in place, substantially as described.

2. An animal holder, comprising a bar, yokes held to slide transversely in the bar and adapted to embrace the legs of an animal, clamping pieces held to slide on the yokes and at one side of the bar, locking plates held to slide on the yokes, a fastening device to secure the locking plates to the yokes, and thumb screws held to turn in the locking plates and adapted to impinge on the clamping pieces, substantially as described.

3. An animal holder, comprising a bar, U-shaped yokes held to slide transversely in the bar, bent clamping pieces held to slide on the yokes at one side of the bar, locking plates held to slide on the yokes outside of the clamping pieces, fastening devices to secure the locking plates to the yokes, and adjusting screws held to turn in the locking plates and impinge on the clamping pieces, substantially as described.

4. An animal holder, comprising a bar having reduced and rounded portions which fit against the legs of an animal, yokes held to slide transversely in the bar and to span the reduced portions thereof, the yokes being also adapted to embrace the legs of an animal, clamping pieces held to slide on the yokes at one side of the bar, and fastening devices to secure the clamping pieces to the yokes, substantially as described.

5. The combination with the bar, of fastening devices to secure it to the legs of an animal, a clip or clasp attached to one end of the bar, and a loop secured to the clip or clasp and adapted to embrace the neck of an animal, substantially as described.

OLIVER M. KELSO.

Witnesses:
P. M. CASADY,
H. F. GREEN.